(12) United States Patent
Ozawa et al.

(10) Patent No.: US 9,281,533 B2
(45) Date of Patent: Mar. 8, 2016

(54) EXHAUST DEVICE OF FUEL CELL VEHICLE

(75) Inventors: Naoki Ozawa, Shizuoka-ken (JP); Shiro Matsumoto, Shizuoka-ken (JP); Kengo Ikeya, Shizuoka-ken (JP)

(73) Assignee: SUZUKI MOTOR CORPORATION, Shizuoka-Ken (JP)

( * ) Notice: Subject to any disclaimer, the term of this patent is extended or adjusted under 35 U.S.C. 154(b) by 252 days.

(21) Appl. No.: 13/980,004

(22) PCT Filed: Feb. 29, 2012

(86) PCT No.: PCT/JP2012/055045
§ 371 (c)(1),
(2), (4) Date: Jul. 16, 2013

(87) PCT Pub. No.: WO2012/137560
PCT Pub. Date: Oct. 11, 2012

(65) Prior Publication Data
US 2013/0302720 A1    Nov. 14, 2013

(30) Foreign Application Priority Data

Apr. 6, 2011    (JP) .................................. 2011-084160

(51) Int. Cl.
*H01M 8/04*    (2006.01)
*B60K 1/04*    (2006.01)
(Continued)

(52) U.S. Cl.
CPC ............. *H01M 8/04761* (2013.01); *B60K 1/04* (2013.01); *B60K 11/08* (2013.01); *B60K 13/02* (2013.01);
(Continued)

(58) Field of Classification Search
CPC .......... B60K 11/08; B60K 13/02; B60K 1/04; B60K 2001/0411; H01M 8/04089; H01M 8/2485; H01M 8/04761

USPC .......................................................... 429/513
See application file for complete search history.

(56) References Cited

U.S. PATENT DOCUMENTS

| | | | | |
|---|---|---|---|---|
| 6,715,571 | B2 * | 4/2004 | Nakamori | .................... 180/65.1 |
| 2003/0017798 | A1 * | 1/2003 | Hanaya et al. | ................ 454/147 |
| 2010/0243351 | A1 * | 9/2010 | Sakai | .................. B60K 11/085 |
| | | | | 180/68.1 |

FOREIGN PATENT DOCUMENTS

| JP | 2001-229948 | 8/2001 |
|---|---|---|
| JP | 2003-034267 | 2/2003 |

(Continued)

OTHER PUBLICATIONS

International Search Report and Written Opinion for International Application No. PCT/JP2012/055045 mail May 22, 2012.

*Primary Examiner* — Jonathan Jelsma
*Assistant Examiner* — Rashid Alam
(74) *Attorney, Agent, or Firm* — Alston & Bird LLP

(57) ABSTRACT

To achieve smooth drawing of air into a fuel cell, the air-flow resistance of an exhaust passage is reduced and intrusion of water into an exhaust duct is prevented. In the present invention, in an exhaust device of a fuel cell vehicle, an exhaust chamber is attached to a lower surface of the front hood, the exhaust duct extends upward in a vertical direction from a rear portion of a fuel cell case, an exhaust port at an upper end of the exhaust duct opens to an interior of the exhaust chamber, a penetrating hole through which the inside of the exhaust chamber communicates with the outside space, is formed in the front hood in a portion in front of the exhaust port in a vehicle front and rear direction, the penetrating hole is covered with a cover, and an opening portion opening toward a rear side of the vehicle and being positioned above and away from an upper surface of the front hood, is formed in the cover.

5 Claims, 3 Drawing Sheets

(51) Int. Cl.
*B60K 11/08* (2006.01)
*B60K 13/02* (2006.01)
*H01M 8/24* (2006.01)
*B60K 13/04* (2006.01)

(52) U.S. Cl.
CPC ........ *H01M 8/04089* (2013.01); *H01M 8/2485* (2013.01); *B60K 13/04* (2013.01); *B60K 2001/0411* (2013.01); *H01M 2250/20* (2013.01); *Y02E 60/50* (2013.01); *Y02T 90/32* (2013.01)

(56) References Cited

FOREIGN PATENT DOCUMENTS

| JP | 2003-341554 | 12/2003 |
| JP | 2004-040950 | 2/2004 |

\* cited by examiner

EXHAUST DEVICE OF FUEL CELL VEHICLE

CROSS-REFERENCE TO RELATED APPLICATIONS

This application is a national stage application filed under 35 U.S.C. 371 of International Application No. PCT/JP2012/055045, filed Feb. 29, 2012, which claims priority from Japanese Patent Application No. 2011-084160, filed Apr. 6, 2011, each of which is incorporated by reference herein in its entirety.

TECHNICAL FIELD

The present invention relates to an exhaust device of a fuel cell vehicle. In particular, the present invention relates to an exhaust device of a fuel cell vehicle which can achieve smooth intake and exhaust of a fuel cell and can prevent intrusion of water.

BACKGROUND ART

In a kind of fuel cell vehicle, a fuel cell including a fuel cell stack, which is formed by stacking a plurality of fuel-cell cells, is used as a drive energy source. In this fuel cell vehicle, air used as a reaction gas is supplied to the fuel cell which is housed in a fuel cell case, by use of an intake duct. After that, the air is made to react with hydrogen. Excess air and excess hydrogen gas are discharged from the fuel cell, are discharged to the exterior of the vehicle through an exhaust passage which includes an exhaust duct of an exhaust device.

Exhaust of an air-cooled fuel cell which is discharged by the exhaust device, includes excess hydrogen and air hotter than the outside. As a result, the exhaust is lighter than air at normal temperature. Accordingly, flow of exhaust is facilitated in a case in which an exhaust port of the exhaust duct is directed upward. Furthermore, in order to reduce the air-flow resistance, the exhaust device is preferably configured such that the exhaust passage of the exhaust duct has few curves and has short length. However, when the exhaust port opens upward, water is likely to intrude into the exhaust port.

Regarding the exhaust device of a fuel cell vehicle, the following techniques are disclosed.

PTL 1 discloses that a hydrogen ventilation duct is provided in a hood of a fuel cell vehicle. PTL 2 discloses that a plurality of intake and exhaust ducts are joined to a cooling duct of a fuel cell unit.

CITATION LIST

Patent Literatures

PTL 1: Japanese Patent Application Laid-Open No. 2003-34267

PTL 2: Japanese Patent Application Laid-Open No. 2001-229948

SUMMARY OF INVENTION

Technical Problems

However, in the exhaust device disclosed in PTL 1, the hydrogen ventilation duct is interposed between an outer panel and an inner panel of the hood. As a result, the hydrogen ventilation duct has a small volume of the inner space, and the hydrogen ventilation duct is insufficient to function as the exhaust passage through which the excess air flows. Furthermore, the inner space of the hydrogen ventilation duct includes a plurality of tube portions, guide plates, and the like. As a result, the structure thereof is complicated, and pressure loss increases.

In the exhaust device disclosed in PTL 2, the cooling duct includes: a plurality of switching valves for switching a cooling air passage; a fan; temperature detecting means; and control means for the switching valves and the fan. As a result, the configuration of the exhaust device is complicated. Furthermore, an exhaust passage including the cooling duct and the intake and exhaust ducts becomes longer. As a result, pressure loss in exhaust is increased.

An object of the present invention is to provide an exhaust device of a fuel cell vehicle which can achieve smooth drawing of air into a fuel cell by reducing the air-flow resistance of an exhaust passage and can prevent intrusion of water into an exhaust duct.

Solution to Problems

The present invention is an exhaust device of a fuel cell vehicle comprising; a fuel cell case housing a fuel cell, the fuel cell case being arranged in a space which is formed on a front portion of the vehicle so as to be covered with a front hood from above; an intake duct and an exhaust duct which are connected to the fuel cell case; and a gas passage provided in the fuel cell; wherein the intake duct and the exhaust duct communicate with each other through the gas passage; wherein excess air and excess hydrogen gas which are discharged from the fuel cell, are discharged to an exterior of the vehicle through an exhaust passage which includes the exhaust duct; wherein an exhaust chamber is attached to a lower surface of the front hood; wherein the exhaust duct extends upward in a vertical direction from a rear portion of the fuel cell case; wherein an exhaust port is provided on an upper end of the exhaust duct, and the exhaust port opens to an interior of the exhaust chamber; wherein a penetrating hole is formed on a portion of the front hood which is positioned in front of the exhaust port in a vehicle front and rear direction, and the interior of the exhaust chamber communicates with an outer space through the penetrating hole; wherein the penetrating hole is covered with a cover; and wherein an opening portion is formed on the cover, the opening portion is positioned above an upper surface of the front hood so as to be away from the upper surface thereof, and the opening portion opens toward a rear end of the vehicle.

Advantageous Effects of Invention

Regarding the exhaust device of a fuel cell vehicle of the present invention, a downstream end portion of the exhaust passage opens above the front hood. As a result, the length of the exhaust passage including the exhaust duct can be reduced. Therefore, the air-flow resistance of the exhaust passage can be reduced. Accordingly, it is possible to smoothly discharge the excess air and the excess hydrogen from the fuel cell to the exterior of the vehicle, and it is possible to smoothly draw air into the intake duct.

Regarding the exhaust device of a fuel cell vehicle of the present invention, a portion of the exhaust passage which extends from the exhaust port of the exhaust duct to the opening portion of the cover, is curved, and the opening portion is positioned above the upper surface of the front hood so as to be away from the upper surface thereof. Accordingly, intrusion of water into the exhaust duct from the outside can be prevented.

DESCRIPTION OF EMBODIMENT

An Embodiment of the present invention is described below based on the drawings.

Embodiment

Figure 1:
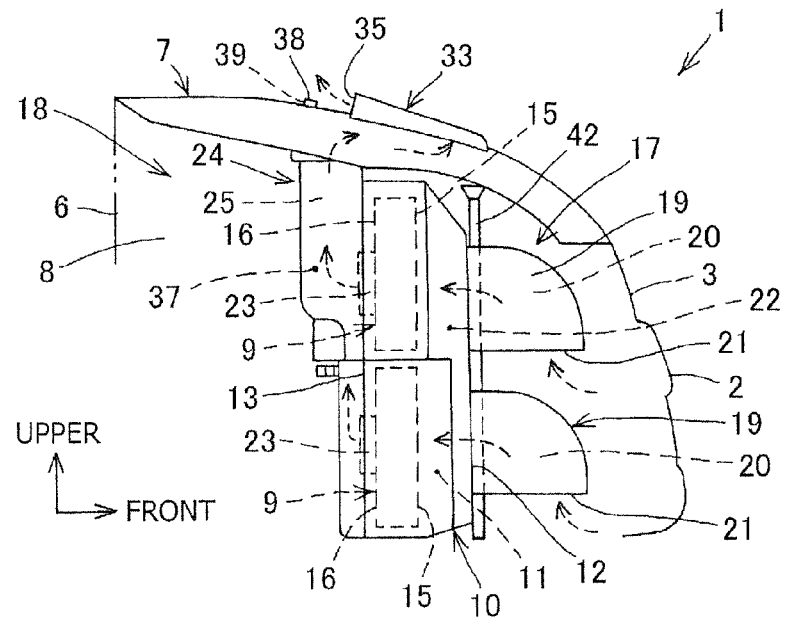
FIG. 1 is a right-side view of a front portion of a fuel cell vehicle. (Embodiment)
Figure 2:
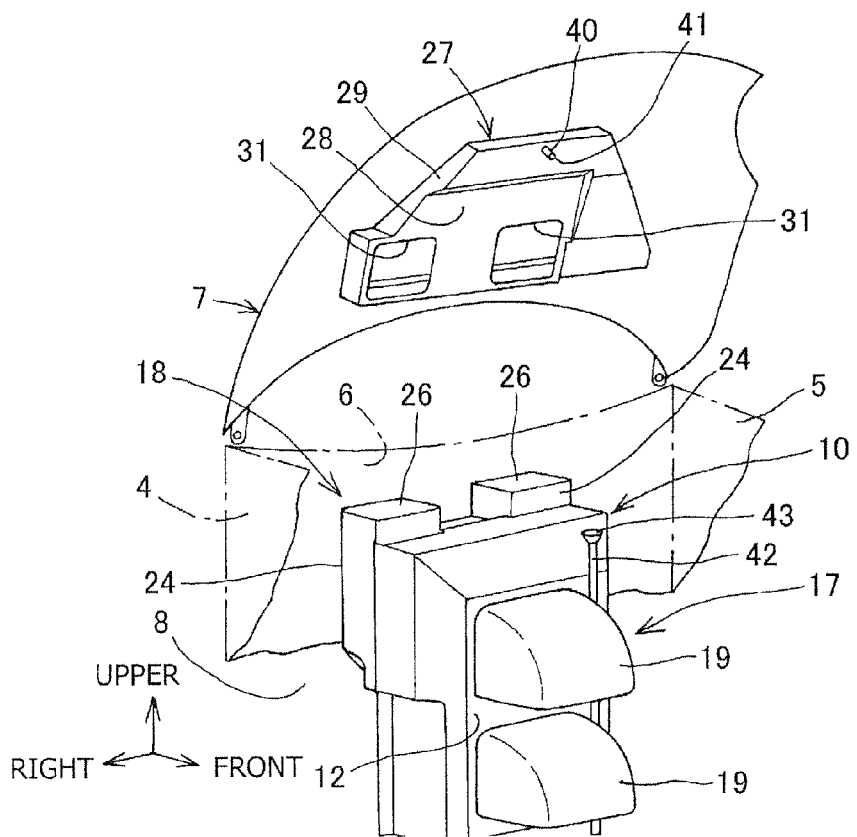
FIG. 2 is a perspective view of an exhaust device of the fuel cell vehicle having a front hood opened, the exhaust device being viewed from a right front upper side. (Embodiment)

FIGS. 1 to 5 illustrate the Embodiment of the present invention. In FIGS. 1 and 2, reference numeral "1" denotes a fuel cell vehicle, reference numeral "2" denotes a front bumper, reference numeral "3" denotes a front grille, reference numeral "4" denotes a right side panel, reference numeral "5" denotes a left side panel, reference numeral "6" denotes a dash panel, reference numeral "7" denotes a front hood, and reference numeral "8" denotes a front compartment. The fuel cell vehicle 1 is a four-wheel vehicle. The fuel cell vehicle 1 is provided with the front compartment 8 in a space which is formed on a front portion of the vehicle, this front portion is surrounded by the front bumper 2, the front grille 3, the right side panel 4, the left side panel 5, and the dash panel 6, and furthermore, the front portion is covered with the front hood 7 from above. A fuel cell case 10 housing fuel cells 9 is arranged in the front compartment 8.

The fuel cell case 10 is formed in a substantially-square box shape, this substantially-square box shape is thin in a front and rear direction, is longer in an upper and lower direction than in a right and left direction, and the fuel cell case 10 has a case space 11. The fuel cell case 10 is arranged in the front compartment 8 such that a front portion 12 of the fuel cell case 10 is directed to a front end of the vehicle and a rear portion 13 of the fuel cell case 10 is directed to a rear end of the vehicle. In the fuel cells 9, multiple fuel-cell cells are stacked, and as a result, fuel cell stacks are formed. Each fuel cell 9 is formed in a substantially-square box shape, this substantially-square box shape is thin in the front and rear direction, and is longer in the right and left direction than in the upper and lower direction, and a gas passage 14 is provided in an interior of each full cell 9 (see FIG. 4). Two fuel cells 9 are installed in the case space 11 of the fuel cell case 9 while being arranged one on top of the other in the vehicle upper and lower direction, air drawing surfaces 15 of the fuel cells 9 is directed to the front end of the vehicle, and air discharging surfaces 16 of the fuel cells 9 is directed to the rear end of the vehicle.

The fuel cell vehicle 1 includes an intake device 17 and an exhaust device 18. As shown in FIG. 2, in the intake device 17, two intake ducts 19 are attached to the front portion 12 of the fuel cell case 10 while being arranged one on top of the other in the vehicle upper and lower direction. An intake duct space 20 is provided in an interior of each intake duct 19, the intake duct space 20 communicates with the case space 11 of the fuel cell case 9, and an air drawing port 21 opening toward a lower end of the vehicle is provided in a lower portion of the intake duct space 20. Each intake duct 19 draws in air which flows into the front compartment 8 from the front grille 3, from the air drawing port 21. Each intake duct 19 guides the air to the case space 11 of the fuel cell case 10 through the intake duct space 20. Air outside the vehicle is supplied to the air drawing surfaces 15 of the fuel cells 9 as a reaction gas as well as air used for cooling, by an intake passage 22 which is formed of the intake duct spaces 20 of the intake ducts 19 and the case space 11 of the fuel cell case 10.

Air supplied to the air drawing surface 15 of each fuel cell 9 is sent from an interior of the gas passage 14 to a cathode, and then, the air reacts with hydrogen at an anode to generate electric power. Excess air which has not reacted with hydrogen cools the fuel cell 9 while flowing through the gas passage 14. Excess hydrogen is mixed into the excess air, and the excess air is discharged from the air discharging surface 16. Therefore, the fuel cells 9 are configured as air-cooled fuel cells.

The exhaust device 18 is arranged in the rear portion 13 of the fuel cell case 10. As shown in FIGS. 1 and 2, in the exhaust device 18, exhaust fans 23 are provided to face the air discharging surfaces 16 of fuel cells 9. Two exhaust ducts 24 are attached to the rear portion 13 of the fuel cell case 10 so as to cover the exhaust fans 23 while being arranged side by side in the vehicle width direction. Each exhaust duct 24 is formed in a tubular shape extending in a vertical direction. An exhaust duct space 25 is provided in an interior of each exhaust duct 2, the exhaust duct space 25 communicates with the air discharging surfaces 16 of the fuel cells 9. An exhaust port 26 opening upward is provided at an upper end of each exhaust duct 24. The exhaust ducts 24 guide the excess air and the excess hydrogen which are discharged from the air discharging surfaces 16 of the fuel cells 9, to a lower surface side of the front hood 7 which is positioned above the exhaust ducts 24.

Figure 4:
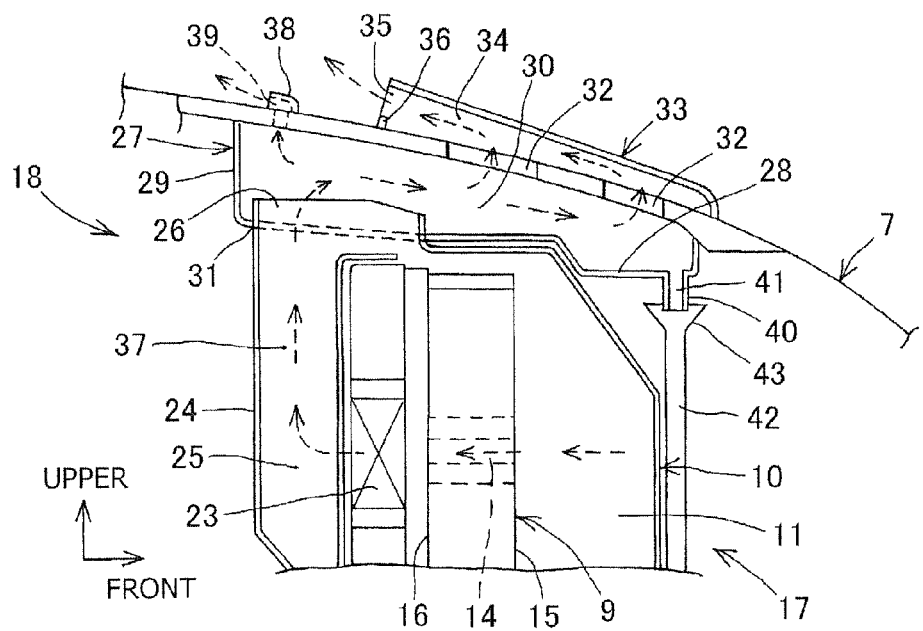
FIG. 4 is a cross-sectional view taken along the A-A line of FIG. 3. (Embodiment)

As shown in FIGS. 2 and 4, in the exhaust device 18 of the fuel cell vehicle 1, an exhaust chamber 27 is attached to the lower surface of the front hood 7, and the front hood 7 has such a shape that the height thereof in the vehicle upper and lower direction is decreased toward the front end of the vehicle. A chamber space 30 is provided in an interior of the exhaust chamber 27. This chamber space 30 communicates with the exhaust ports 26, and the chamber space 30 is formed in a box shape by a plate-shaped bottom surface portion 28 and an annual peripheral wall portion 29. The height of the plate-shaped bottom surface portion 28 in the vehicle upper and lower direction is decreased toward the front end of the vehicle along the lower surface of the front hood 7. The annular peripheral wall portion 29 surrounds an outer periphery of the bottom surface portion 28, and the annular peripheral wall portion 29 is attached to the lower surface of the front hood 7. Two insertion hole portions 31 are formed on the bottom surface portion 28 of the exhaust chamber 27, and the exhaust ports 26 of the exhaust ducts 24 are inserted into the insertion hole portion 31. As shown in FIG. 4, the two exhaust ducts 24 extend linearly upward in the vertical direction from the rear portion 13 of the fuel cell case 10. Upper ends of the exhaust ducts 24 are inserted into the exhaust chamber 27 from the insertion hole portions 31, and as a result, the exhaust ports 26 open to the inside of the chamber space 30 of the exhaust chamber 27.

Figure 3:
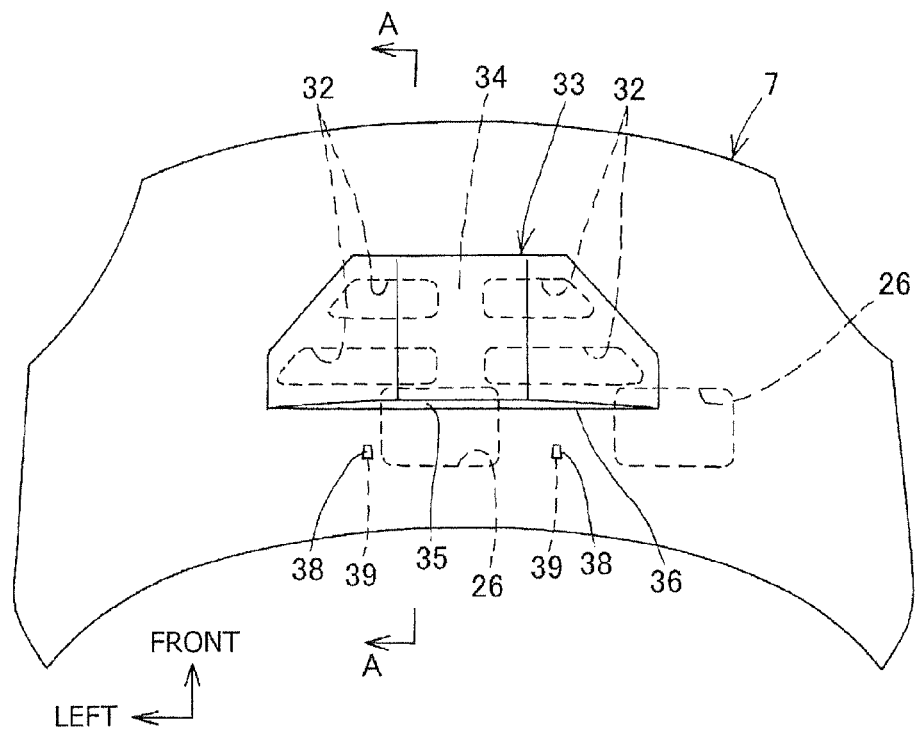
FIG. 3 is a plan view of the front hood. (Embodiment)

As shown in FIGS. 3 and 4, in the front hood 7, a plurality of penetrating holes 32 are formed in a portion in front of the exhaust ports 26 of the exhaust ducts 24 in the vehicle front and rear direction, and the interior of the exhaust chamber 27 communicates with the space outside the vehicle through the penetrating hole 32. Four penetrating holes 32 are formed on the vehicle front side of the exhaust ports 26 of the exhaust ducts 24 at positions which are shifted therefrom in the vehicle width direction, when the front hood 7 is seen from above. The excess air and the excess hydrogen, having flowed into the exhaust chamber 27, are guided to the penetrating holes 32 on the vehicle front side.

Figure 5:
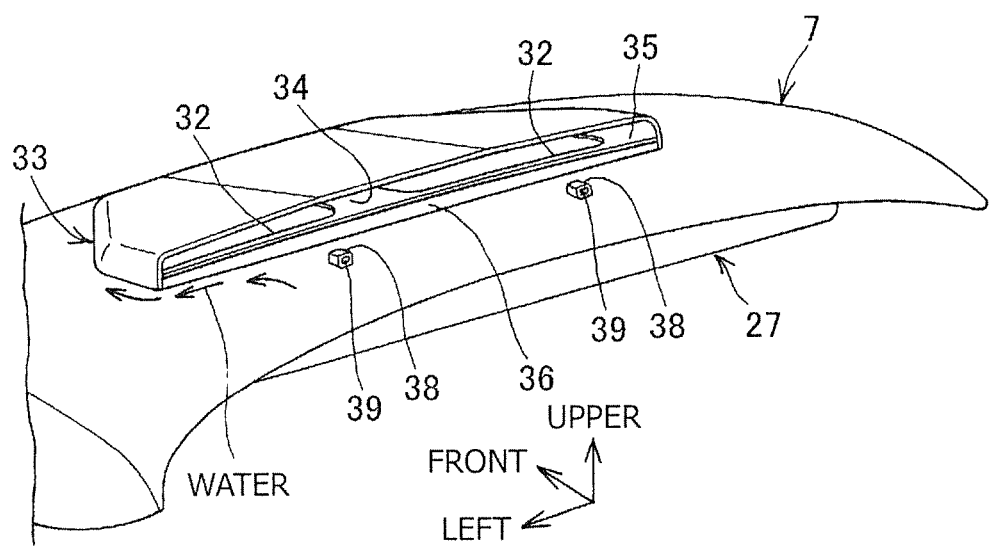
FIG. 5 is a perspective view of the front hood viewed from the left rear upper side. (Embodiment)

As shown in FIGS. 4 and 5, a cover 33 covering the penetrating holes 32 is provided on an upper surface of the front hood 7. The cover 33 has a cover space 34 between the cover 33 and the upper surface of the front hood 7, and the cover space e34 communicates with the penetrating holes 32. An opening portion 35 is formed in an end portion of the front hood 7 on the vehicle rear side, the opening portion 35 opens toward the rear side of the vehicle, and the opening portion 35 is positioned above the upper surface of the front hood 7 so as to be away from the upper surface thereof. A vertical wall portion 36 protruding upward over the entire width of the opening portion 35 is provided on the upper surface of the front hood 7 below the opening portion 35. As a result, the opening portion 35 can be positioned above and away from the upper surface of the front hood 7. The excess air and the excess hydrogen, having entered the cover space 34 of the cover 33 from the penetrating holes 32, are discharged toward the rear side of the vehicle from the opening portion 35. The excess air and the excess hydrogen, which are discharged from the fuel cells 9, are discharged to the exterior of the vehicle through an exhaust passage 37. Note that the exhaust passage 37 is formed of the exhaust duct spaces 25 of the exhaust ducts 24, the chamber space 30 of the exhaust chamber 27, and the cover space 34 of the cover 33.

In the exhaust device 18 of the fuel cell vehicle 1, the opening portion 35 of the cover 33 opens toward the rear end of the vehicle, and the opening portion 35 is positioned above the upper surface of the front hood 7 so as to be away from the upper surface thereof, while the exhaust ports 26 of the exhaust ducts 24 and the penetrating holes 32 of the front hood 7 are shifted from each other in the vehicle front and rear direction and in the vehicle width direction on the top view. Accordingly, water is less likely to enter the exhaust ducts 24.

Accordingly, in the exhaust device 18, the length of the exhaust passage 37 is less than that of a structure in which the exhaust ducts 24 are curved in a labyrinth shape to prevent intrusion of water. As a result, it is possible to reduce the length of the exhaust passage 37 including the exhaust ducts 24, and it is possible to reduce the air-flow resistance of the exhaust passage 37. The exhaust device 18 can smoothly discharge the excess air and the excess hydrogen from the fuel cells 9 to the outside of vehicle, and as a result, air can be smoothly drawn into the intake ducts 19.

In addition, in the exhaust device 18 of the fuel cell vehicle 1, a portion of the exhaust passage 37 extends from the exhaust ports 26 of the exhaust ducts 24 to the opening portion 35 of the cover 33 via the exhaust chamber 27 and the penetrating holes 32 of the front hood 7 This portion of the exhaust passage 37 is curved, and a lower edge portion of the opening portion 35 is positioned away from the upper surface of the front hood 7 by the vertical wall portion 36 which extends upward from the upper surface of the front hood 7. Accordingly, as shown in the arrows of FIG. 5, intrusion of water into the exhaust ducts 24 from the outside can be prevented.

As shown in FIGS. 3 to 5, in the exhaust device 18 of the fuel cell vehicle 1, hydrogen gas discharging portions 38 are provided on the vehicle rear side of the opening portion 35 of the cover 33, on the upper surface of the front hood 7. The hydrogen gas discharging portions 38 forms a hydrogen gas discharging ports 39. The hydrogen gas discharging ports 39 penetrate the front hood, and the outer space and a rear portion of the interior of the exhaust chamber 27 communicate with each other through the hydrogen gas discharging ports 39. In the exhaust device 18, the hydrogen gas discharging ports 39 are formed to open toward the rear side, at positions shifted from the positions of the exhaust ports 26 of the exhaust ducts 24 in the vehicle width direction, when the front hood 7 is seen from above. The hydrogen gas discharging pots 39 penetrate the front hood 7, and the outer space and the interior of the exhaust chamber 27 communicate with each other through the hydrogen gas discharging ports 39.

Accordingly, when the hydrogen gas is accumulated at a high position on a rear portion of the chamber space 30 in the exhaust chamber 27, the exhaust device 18 can discharge this hydrogen gas rearward to the exterior of the vehicle from the hydrogen gas discharging ports 39 in a condition in which the fuel cells 9 are not operating.

As shown in FIGS. 2 and 4, in the exhaust device 18 of the fuel cell vehicle 1, the bottom surface portion 28 of the exhaust chamber 27 has such a shape that the height thereof in the vehicle upper and lower direction becomes lower toward the front side of the vehicle. Furthermore, a water drain port 41 is formed in a front portion of the bottom surface portion 28 in which the height of the bottom surface portion 28 is lowest, by a water drain portion 40 protruding downward. A drain pipe 42, which guides water flowing out from the water drain port 41 downward, is provided below the water drain port 41. In an upper end of the drain pipe 42, a funnel-shaped receiving portion 43 opening to expand upward is provided, and the drain pipe 42 is attached to the front portion 12 of the fuel cell case 10 which corresponds to a component arranged below the front hood 7. The water drain portion 40 of the exhaust chamber 27 is separated from the receiving portion 43 of the drain pipe 42 when the front hood 7 is opened, and the water drain portion 40 is inserted into the receiving portion 43 of the drain pipe 42 when the front hood 7 is closed.

Therefore, in the exhaust device 18, when water intrudes into the exhaust chamber 27, the water is guided to the front side and made to flow out from the water drain port 41 by the bottom surface portion 28 which has such a shape that the height thereof becomes lower toward the front side of the vehicle, the water is received by the receiving portion 43 of the drain pipe 42, and then, the water is guided downward. Accordingly, the intrusion of water into the exhaust ducts 24 is prevented.

INDUSTRIAL APPLICABILITY

The present invention is the exhaust device of a fuel cell vehicle which can achieve smooth drawing of air into the fuel cells by reducing the air-flow resistance of the exhaust passage and can prevent intrusion of water into the exhaust ducts. The present invention can be applied not only to a fuel cell vehicle but also to a cooling exhaust duct which discharges gas from an upper surface of a hood of a car.

REFERENCE SIGNS LIST

1 Fuel cell vehicle
7 Front hood
8 Front compartment
9 Fuel cell
10 Fuel cell case
14 Gas passage
17 Intake device
18 Exhaust device
19 Intake duct
21 Air drawing port
22 Intake passage
23 Exhaust fan
24 Exhaust duct 26 Exhaust port
27 Exhaust chamber
28 Bottom surface portion
32 Penetrating hole
33 Cover
35 Opening portion
36 Vertical wall portion
37 Exhaust passage
39 Hydrogen gas discharging port
41 Water drain port
42 Drain pipe

The invention claimed is:

1. An exhaust device of a fuel cell vehicle comprising:
a fuel cell case housing a fuel cell, the fuel cell case being arranged in a space which is formed on a front portion of the vehicle so as to be covered with a front hood from above;
an intake duct and an exhaust duct which are connected to the fuel cell case; and
a gas passage provided in the fuel cell;
wherein the intake duct and the exhaust duct communicate with each other through the gas passage;
wherein excess air and excess hydrogen gas which are discharged from the fuel cell, are discharged to an exterior of the vehicle through an exhaust passage which includes the exhaust duct;
wherein an exhaust chamber is attached to a lower surface of the front hood;
wherein the exhaust chamber is arranged above the fuel cell case so as to be extended at least between front and rear end portions, in a vehicle front and rear direction, of the fuel cell case;
wherein a bottom surface portion of the exhaust chamber is formed such that a height, in a vehicle upper and lower direction, of the bottom surface portion is decreased toward a front end of the vehicle;
wherein the exhaust duct extends upward in a vertical direction from a rear portion of the fuel cell case;
wherein an exhaust port is provided on an upper end of the exhaust duct, and the exhaust port opens to an interior of the exhaust chamber;
wherein a penetrating hole is formed on a portion of the front hood which is positioned in front of the exhaust port in the vehicle front and rear direction, and the interior of the exhaust chamber communicates with an outer space through the penetrating hole;
wherein the penetrating hole is covered with a cover; and,
wherein an opening portion is formed on the cover, the opening portion is positioned above an upper surface of the front hood so as to be away from the upper surface thereof, the opening portion opens toward a rear end of the vehicle, and the opening portion is arranged at the rear of the penetrating hole in the vehicle front and rear direction.

2. The exhaust device of a fuel cell vehicle according to claim 1, wherein
a hydrogen gas discharging port is formed at a position which is shifted from a position of the exhaust port of the exhaust duct in a vehicle width direction, when the front hood is seen from above,
the hydrogen gas discharging port penetrates the front hood, and
the interior of the exhaust chamber and the outer space communicate with each other through the hydrogen gas discharging port.

3. The exhaust device of a fuel cell vehicle according to claim 1, wherein
a drain port is formed on a front portion of the bottom surface portion of the exhaust chamber,
a drain pipe is attached to a component which is arranged below the front hood, and
the drain pipe guides fluid which flows out from the drain port, downward.

4. The exhaust device of a fuel cell vehicle according to claim 1, wherein
the penetrating hole is arranged so as to overlapped with a front region, in the front and rear direction, of the exhaust chamber, in the upper and rear direction, and
the opening portion is arranged so as to overlapped with a rear region, in the front and rear direction, of the exhaust chamber, in the upper and rear direction.

5. The exhaust device of a fuel cell vehicle according to claim 1, wherein
the front hood is formed in an arc shape such that a height, in the vehicle upper and lower direction, of the front hood is decreased toward the front end of the vehicle, and
a bottom surface of a passage from the penetrating hole of the cover to the opening portion thereof is formed in an arc shape along an upper surface of the front hood such that a height, in the vehicle upper and lower direction, of the bottom surface of the passage is decreased toward the front end of the vehicle.

* * * * *